Sept. 8, 1953        A. A. KRUZE        2,651,136

UNITARY SINKER LEADER AND FISHHOOK

Filed April 18, 1952

INVENTOR.
Andrew A. Kruze.
BY
Stanley Lightfoot
Attorney.

Patented Sept. 8, 1953

2,651,136

UNITED STATES PATENT OFFICE 2,651,136

UNITARY SINKER LEADER AND FISHHOOK

Andrew A. Kruze, Detroit, Mich.

Application April 18, 1952, Serial No. 283,000

1 Claim. (Cl. 43—44.9)

This application is a continuation-in-part of my application Serial No. 141,445, filed January 11, 1950, now abandoned, for Combined Sinker and Steel Leader.

This invention relates to improvements in fishing tackle more especially for fishing above although close to the bed of a stream, or other body of water, and has for its object to provide a unitary structure for attachment to the end of a fishing line, said structure involving a rod-like leader having a sinker secured at that end to which the fishing line is to be attached, and a hook secured at the other end of said leader; with a conically or similarly flared tail-member mounted on said leader adjacent to said sinker and preferably connected to said sinker. Said tail-member is of such outer configuration and of such weight relative to such sinker that, in descending through the water upon being cast, the sinker will precede the tail-member thereby maintaining the rod upright during such descent.

Thus, the flow of water about the side wall of said tail-member will result in a "parachute" effect ensuring the elevation of said leader and its hook above said sinker during and to the completion of its descent through the water; whereupon, the descent being arrested and the flow of water upwardly about the tail-member ceasing, the said tail-member and its coaxial leader will overbalance, with the sinker resting as a fulcrum on the bed of the body of water, to an extent limited by the contact of the side wall flared tail-member with such bed whereby the said leader will then be maintained at an acute angle to the bed of the body of water and the hook at a corresponding height above said bed.

Thus, it is an object of this invention to provide in such unitary structure a conically or similarly flared tail-member, of materially lighter weight than such sinker, said member having a dual purpose, one if which purposes is to properly elevate the leader above the sinker during its descent through the water and the other of which is to position the leader at an angle to the bed of the body of water when the sinker comes to rest on such bed.

The invention therefore contemplates the elimination of the danger of the hook or its leader becoming imbedded in clay or soft material forming the bed of the body of water, or in low-growing weeds or objects on such bed; and by insuring that the hook is elevated in the manner referred to when the sinker comes to rest on the bed, the baited hook at all times is at such elevation from the bed as to form an effective lure for fish such as ordinarily swim at these low levels.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein.

Similar characters of reference indicate similar parts in the several figures of the drawing.

Figure 1:
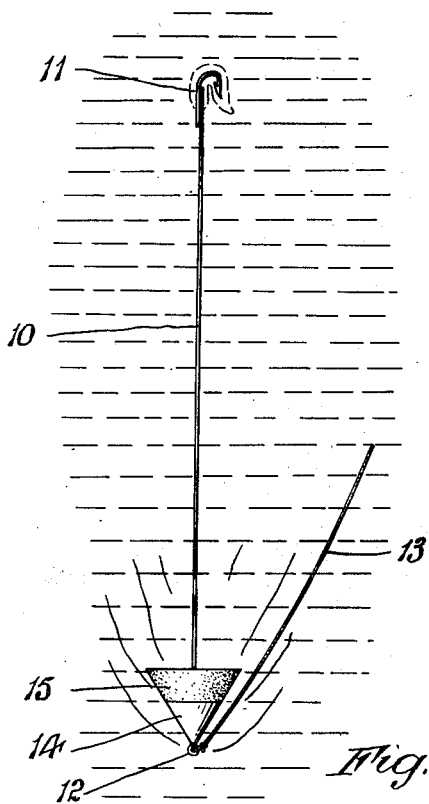
Figure 1 is a pictorial elevation showing my improved fishing device in the act of descending through a body of water to the bed thereof.

The unitary structure hereinbefore referred to comprises four main parts, namely, a rod-like leader 10, which might quite conveniently be of stainless steel wire, provided, at what might properly be termed its upper end, with a hook 11 and at its lower end with an eye 12, or other convenient means, whereby a fishing line 13 may be attached thereto so that the said leader is freely swingable about the attached end of said line. It is preferred that the shank of the hook be rigidly affixed to and in alignment with said leader 10 as illustrated.

A third element of said unitary structure is the sinker 14, such as of lead, which is immovably secured to the lower end of said leader 10 adjacent to the eye 12; and the fourth element of said unitary structure is a flared skirt or tail-member 15, which is shown as being of a tapered or frusto-conical form with its smaller end abutting the upper or wider end of said sinker 14 for the sake of neatness and uniformity of design although, as will become apparent, the strict matching of the surface lines of the weight 14 and the tail-member 15 is not absolutely essential to the functioning of the device.

It is important, however, that the combined weight of the leader 10 and the tail-member 15 should not exceed that of the sinker 14, otherwise the characteristic actions sought in this device, particularly in its descent through the water and its position upon eventually coming to rest, may be lost.

It is intended that the tail-member 15 be at all times maintained in its position, on the lower end portion of the leader adjacent the sinker 14, and it may be conveniently secured directly to the sinker such as by the threaded engagement shown at 16.

An examination of Figure 1 will clearly show one of the functions of the skirt or tail-member 15 which operates to resist passage through the water in the downward descent of the device, after casting, and thereby assist in ensuring the weighted lower end of the leader descending foremostly in the manner shown with the hook at all times extended upwardly.

Figure 2:
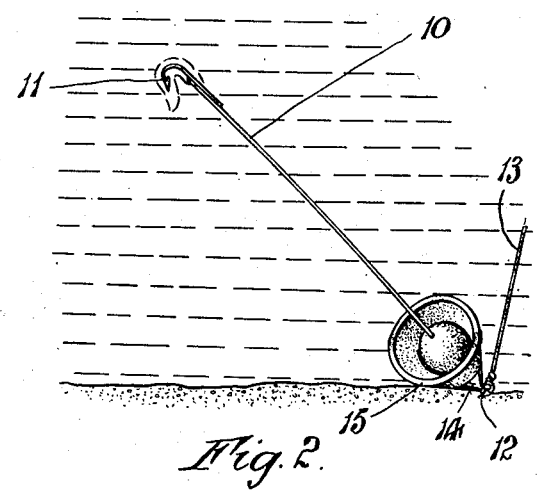
Figure 2 is a similar view showing the device as it rests on the bed of the body of water.

When the apex end of the weight strikes the bed of the body of water, the said weight 14 and its tail-member 15 together with the coaxial leader 10 simply fall over sideways until the flared or laterally extended portion of the tail-member comes to rest upon such bed, as shown in Figure 2, whereupon the said coaxial leader 10 is held without further assistance at an acute angle to the bed of the body of water, with the hook 11 (which has been suitably baited) elevated at a distance above said bed, as shown.

It will be noted that the elements of the said unitary structure are so connected together that there is no relative movement with one element with respect to the other, either during casting or during the operation of fishing, and that the flexible fishing line 13 terminates at the lower end of the sinker 14. Consequently, the device may be drawn either steadily or intermittently along the bed of the body of water if desired without affecting the relationship of the elements of the unitary structure and while continuing to maintain the hook 11 in an angularly elevated position.

Further, sharp and short upward motions of the fishing line may be resorted to where it is desired to impart some slight vertical motion to the hook, for purposes of attraction; and upon ceasing such operation the hook will immediately re-assume its fixed elevation depending upon the level of the bed.

It will be still further apparent that, as the leader 10 with its terminal hook 11 cannot contact the bed of the body of water when cast or upon the device coming to rest thereon, danger of the free end of the said leader becoming entangled with low lying snags or obstructions, or of its hook becoming imbedded in sand or clay in a manner which would interfere with its proper described positioning when the device eventually comes to rest on the said bed of the water, is minimized.

Figure 3:
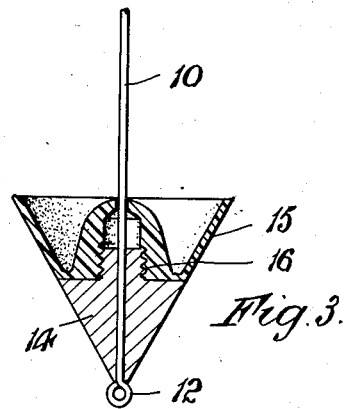
Figure 3 is a longitudinal section of the sinker and tail-member assembly of the device.

Although I prefer the form of sinker and tail-member shown in Figures 1, 2, and 3 of the drawing, wherein the tail-member is shown as being hollowed out for the sake of lightness and conservation of material, it is not intended that the invention be limited to such precise shape and structure but that such shape and structure be governed by obvious variations compatible with the functions hereinbefore described.

Figure 4:
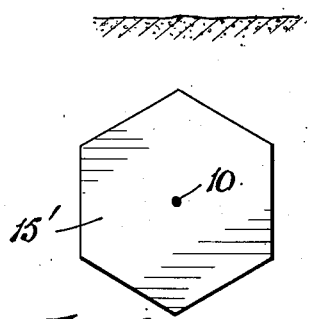
Figure 4 is an end elevation of a modified form of tail-member.
Figure 6:
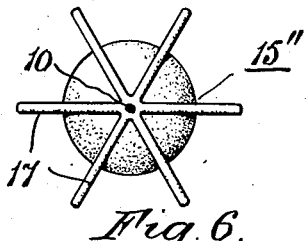
Figure 6 is an end elevation of a further modified form of tail-element.
Figure 5:
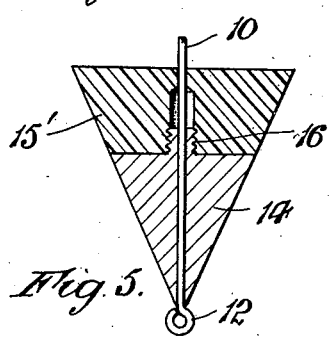
Figure 5 is a longitudinal section of the same.
Figure 7:
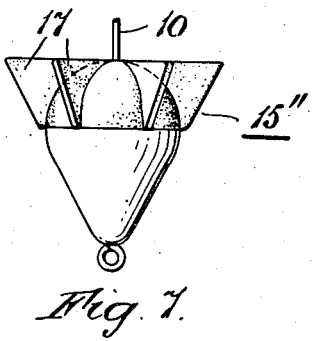
Figure 7 is a side elevation of the same.

As examples of such variations, I show in Figures 4 and 5 a tail-member 15' which is in the form of a frusto-pyramid and is assumed to be of a material of such lightness and cheapness that the hollowing out as in the previously described structure has not been resorted to. In Figures 6 and 7, the tail-member 15" is shown as being provided with fins 17 to perform the guiding action in the descent of the device through the water and also to assist in supporting the leader 10 at the required angular elevation when the device comes to rest on the bed of the body of water.

Where the sinker 14 is conical, as shown, and of such weight distribution that its natural tendency is to lie on its side with the leader 10 elevated in the manner described, the guiding function of the tail-member in the descent of the device through the water ensures that the said sinker could not become inverted to the extent that it may not assume this position when it reaches the bed of the water; and in this case, the said tail-member need not necessarily be flared to an extent whereby it is always in contact with the bed when the device is at rest thereon although it is intended that its side wall (or fins, as the case may be) operate to contact such bed in the event that some force, such as a violent movement of the water, should tend to urge the said leader 10 unduly down toward the bed of the water especially to such an extent as might result in the fouling of the hook with the bed or with low lying material thereon.

It will be clear that a very important feature and objective of the device described is the "parachute" effect of the tail-member 15 in guiding the device in its descent through the water, as clearly illustrated in Figure 1 of the drawing; and the unitary nature of the structure whereby the four elements thereof referred to which are at all times maintained in positioned relationship one to the other, with the hook 11 extended by a practically rigid leader coaxially of the weight 14, is also important. It should be clearly understood that no part of the fishing line itself is involved in this said unitary structure, the said line being merely attached to the lower weighted extremity of the said unitary structure.

This invention may be developed within the scope of the following claim without departing from the essential features of the said invention, and it is desired that the specification and drawing be read as being merely illustrative of a practical embodiment of the same and not in strictly limiting sense.

What I claim is:

A sinker having a conical shape with greater mass adjacent the apex portion and lesser mass adjacent the base portion, said portion of greater mass having an overall length greater than one-half of the length of the sinker, said base portion being substantially frusto-conical and having a hollow interior, said hollow interior being defined by outwardly and upwardly flaring side wall portions and by a projection of dome shape extending upwardly from the smaller base to the larger base of said base portion, said dome and said portion of greater mass being provided with coaxial bores adapted to receive a leader therethrough for the attachment of a line thereto, said sinker being adapted when cast into a body of water to sink slowly due to the hollow and flaring portions thereof displacing water for the creation of a partial vacuum in said hollow portion.

ANDREW A. KRUZE.

References Cited in the file of this patent

UNITED STATES PATENTS

| Number | Name | Date |
|---|---|---|
| 497,962 | D'Ivernois | May 23, 1893 |
| 1,103,707 | Threm | July 14, 1914 |
| 1,913,425 | Black | June 13, 1933 |
| 1,948,983 | Danielczuk | Feb. 27, 1935 |
| 2,014,517 | Beregow | Sept. 17, 1935 |
| 2,157,003 | Mussina | May 2, 1939 |
| 2,239,934 | Ruiz | Apr. 29, 1941 |

FOREIGN PATENTS

| Number | Country | Date |
|---|---|---|
| 291,925 | Germany | May 13, 1916 |